Patented Aug. 1, 1950

2,517,530

UNITED STATES PATENT OFFICE 2,517,530

PREPARATION OF 2-AMINO-4-HYDROXY-6-FORMYL PTERIDINE

Coy W. Waller, Pearl River, N. Y., assignor to American Cyanamid Company, New York, N. Y., a corporation of Maine No Drawing. Application February 4, 1949,
Serial No. 74,720

6 Claims. (Cl. 260—251.5)

This invention relates to a new and improved process for the preparation of 2-amino-4-hydroxy-6-formyl pteridine.

The compound, 2-amino-4-hydroxy-6-formyl pteridine, is a known compound, its preparation having been described by the present inventor and co-workers in the Annals of the New York Academy of Science, vol. XLVIII, article 5, pages 273-277. This article discloses the preparation of this compound by the degradation of the product obtained by the aerobic fermentation of a bacterium of the genus Corynebacterium with sulfurous acid. This method of obtaining the formyl pteridine obviously does not lend itself to a synthetic commercial method for the preparation of pteroylglutamic acid utilizing the 2-amino-4-hydroxy-6-formyl pteridine as an intermediate.

I have found that this formyl pteridine can be obtained in good yields by the hydrolysis of 2-amino-4-hydroxy-6-dibromomethyl pteridine. This hydrolysis may be carried out at a pH of about ½ to 10 by mixing the dibromomethyl pteridine with a hydrolytic solvent.

The hydrolysis may be carried out using the dibromomethyl pteridine or an acid salt thereof. When using an acid salt it is preferable to dissolve the salt in a small amount of a solvent such as formic acid, methyl Cellosolve, and the like. This is then added to water. However, the salt or the base can be dissolved in an aqueous strong acid which is then mixed with water. When using an aqueous strong acid better results are usually obtained by adding a basifying substance such as sodium acetate, sodium hydroxide, potassium hydroxide, etc. in order to bring the pH to within the preferred range of pH 2 to pH 8.

The reaction may be carried out at a temperature within the range of about 15° C. to about 120° C. The time of reaction varies from a few minutes to about one hour, depending upon the temperature used.

The 2-amino-4-hydroxy-6-dibromomethyl pteridine, used as an intermediate in the present invention, may be obtained by the bromination of the corresponding 6-methyl pteridine as described and claimed in a copending application of James H. Boothe, Serial Number 35,069, filed June 24, 1948.

The 2-amino-4-hydroxy-6-formyl pteridine is useful as an intermediate in the preparation of pteroylglutamic acid. The reaction of this intermediate with para-aminobenzoylglutamic acid to produce pteroylglutamic acid is described and claimed in a copending application of Brian L. Hutchings, Serial Number 73,440 filed January 28, 1949.

In order to illustrate some aspects of the invention in greater detail, the following examples are given which describe the preparation of the intermediate 2-amino-4-hydroxy-6-dibromomethyl pteridine from the corresponding 6-methyl pteridine and the use of this intermediate to prepare the 2-amino-4-hydroxy-6-formyl pteridine.

Example 1

100 g. of 2-amino-4-hydroxy-6-methyl pteridine, 3 liters of 48% hydrobromic acid and 310 g. of bromine are mixed and stirred at steam bath temperature for 2½ hours. A 300 cc. portion is evaporated off under reduced pressure. The solution is cooled and clarified with charcoal. The filtrate, after concentrating under reduced pressure to 600 cc. and cooling, deposited 79 g. of essentially pure 2-amino-4-hydroxy-6-dibromomethyl pteridine hydrobromide.

One gram of 2-amino-4-hydroxy-6-dibromomethyl pteridine hydrobromide is dissolved in 50 cc. of methyl Cellosolve. This solution is mixed with 1½ liters of boiling water. The mixture is stirred at the boiling temperature of the mixture for 20 minutes. After cooling, the product, 2-amino-4-hydroxy-6-formyl pteridine, is filtered off, washed and dried.

Example 2

Two grams of 2-amino-4-hydroxy-6-methyl pteridine, 100 cc. of 48% hydrobromic acid and 14 g. of bromine are mixed and heated in a sealed tube in a steam bath for one hour at 100° C. and in an oil bath at 140° C. for a half hour. After standing overnight, a 5 cc. sample is titrated with standard sodium thiosulfate solution which shows that 1.7 moles of bromine has reacted. The excess bromine is evaporated off under vacuum from the remainder of the reaction mixture. The resulting solution, after chilling, is filtered free of some unreacted pterin. The filtrate is concentrated to about one-third volume under reduced pressure and chilled overnight. Again the solution is filtered and the filtrate concentrated to dryness under vacuum. The residue is predominately 2-amino-4-hydroxy-6-dibromomethyl pteridine hydrobromide.

The residue is dissolved in 164 cc. of water which contained enough hydrochloric acid to effect solution. Two-thirds of this solution is heated to boiling and buffered to about pH 4 by using sodium acetate. After cooling the 2-amino-4-hydroxy-6-formyl pteridine is collected, washed with water and acetone, and dried; weight 1 g.

One hundred milligrams of the above product is dissolved in 100 cc. of boiling water by the use of a few drops of alkali. Excess acetic acid is added immediately. To this hot solution is added an excess of phenylhydrazine in 50% acetic acid. The red phenylhydrazone forms immediately. It is filtered off while the mixture is hot, washed and dried; weight 100 mg. On analysis for carbon, hydrogen and nitrogen the values agree closely with the theoretical values for the phenylhydrazone of 2-amino-4-hydroxy-6-formyl pteridine.

Example 3

Twenty grams of 2-amino-4-hydroxy-6-methyl pteridine and 12 cc. of bromine in 1 liter of 48% hydrobromic acid is refluxed for 1 hour to effect solution and to complete the bromination. This solution is concentrated to 500 cc. under vacuum. The concentrated solution is treated with 21 g. of activated charcoal and run into 3½ liters of cold water. This diluted aqueous solution is precipitated with enough sodium acetate to bring to pH 3 to 5. The 2-amino-4-hydroxy-6-dibromomethyl pteridine is isolated and dried; weight 24 g.

Four grams of the above product is dissolved in 200 cc. of 6 N hydrochloric acid with gentle warming. This solution is poured into 4 liters of boiling water. The resulting solution is treated with sodium acetate until a pH 5 to 6 is obtained. After cooling the solution, the 2-amino-4-hydroxy-6-formyl pteridine is collected and dried; weight 2.5 g.

Example 4

Another experiment is carried out as described in Example 1 with the exception that formic acid is used in place of methyl Cellosolve. The product obtained is 2-amino-4-hydroxy-6-formyl pteridine.

I claim:

1. A method of preparing 2-amino-4-hydroxy-6-formyl pteridine which comprises mixing a member of the group consisting of 2-amino-4-hydroxy-6-dibromomethyl pteridine and salts thereof with an aqueous solution.

2. A method of preparing 2-amino-4-hydroxy-6-formyl pteridine which comprises mixing 2-amino-4-hydroxy-6-dibromomethyl pteridine with an aqueous solution at a temperature within the range of 15° C. to about 120° C.

3. A method of preparing 2-amino-4-hydroxy-6-formyl pteridine which comprises mixing a member of the group consisting of 2-amino-4-hydroxy-6-dibromomethyl pteridine and salts thereof with an aqueous solution for a period of from 5 minutes to one hour at a temperature of from 15° C. to about 120° C.

4. A method of preparing 2-amino-4-hydroxy-6-formyl pteridine which comprises mixing 2-amino-4-hydroxy-6-dibromomethyl pteridine with an aqueous solution in the presence of sodium acetate for a period of from 5 minutes to one hour at a temperature of from 15° C. to about 120° C.

5. A method of preparing 2-amino-4-hydroxy-6-formyl pteridine which comprises dissolving 2-amino-4-hydroxy-6-dibromomethyl pteridine in water in the presence of a mineral acid, adjusting the pH to 3 to 6 with sodium acetate and after 5 minutes to one hour at a temperature of from 15° C. to about 120° C., recovering the 2-amino-4-hydroxy-6-formyl pteridine therefrom.

6. A method of preparing 2-amino-4-hydroxy-6-formyl pteridine which comprises dissolving 2-amino-4-hydroxy-6-dibromomethyl pteridine hydrobromide in methyl Cellosolve, mixing said solution with water for a period of from 5 minutes to one hour at a temperature of from 15° C. to 120° C. and recovering the 2-amino-4-hydroxy-6-formyl pteridine therefrom.

COY W. WALLER.

No references cited.